United States Patent

Cottevieille et al.

[11] Patent Number: 5,820,743
[45] Date of Patent: Oct. 13, 1998

[54] METHOD OF COPOLYMERIZING ANILINE COMPOUNDS

[75] Inventors: Denis Cottevieille, Montreuil; Stanislas Galaj, Arcueil, both of France

[73] Assignee: Alcatel Alsthom Compagnie Generale d'electricite, Paris, France

[21] Appl. No.: 329,850

[22] Filed: Oct. 27, 1994

[30] Foreign Application Priority Data

Oct. 28, 1993 [FR] France ................................. 93 12867

[51] Int. Cl.$^6$ .............................. C25B 3/00; C08G 75/18; C08G 79/02
[52] U.S. Cl. ......................... 205/419; 528/391; 528/422
[58] Field of Search .................. 204/59 R, 78; 528/391, 422

[56] References Cited

U.S. PATENT DOCUMENTS

| | | | |
|---|---|---|---|
| 4,629,540 | 12/1986 | Genieés et al. | 204/59 R |
| 4,940,517 | 7/1990 | Wei | 204/78 |
| 5,227,092 | 7/1993 | Han | 528/422 |
| 5,408,034 | 4/1995 | Galaj et al. | 528/422 |

FOREIGN PATENT DOCUMENTS

| | | |
|---|---|---|
| 0545819A1 | 6/1993 | European Pat. Off. . |
| 2622588A1 | 5/1989 | France . |
| 9001775 | 2/1990 | WIPO . |
| WO93/01229 | 1/1993 | WIPO . |

OTHER PUBLICATIONS

French Search Report FR 9312867 Jul. 4, 1994.

*Primary Examiner*—Kathryn L. Gorgos
*Assistant Examiner*—Edna Wong
*Attorney, Agent, or Firm*—Sughrue, Mion, Zinn, Macpeak & Seas, PLLC

[57] ABSTRACT

A method of manufacturing copolymers having magnetic properties, the method comprising a first step of copolymerization, by oxidation in an acid medium, of a first monomer selected from aniline, possibly substituted aniline, and the corresponding iminoquinone forms, and of a second monomer selected from substituted aminoaromatic compounds, wherein the first step comprises: an induction stage during which the first monomer is put into the presence of at least one oxidizing agent and at least one initiating agent; and a production stage during which, after the second monomer has been added, at least one oxidizing agent and at least one initiating agent are added progressively.

17 Claims, 1 Drawing Sheet

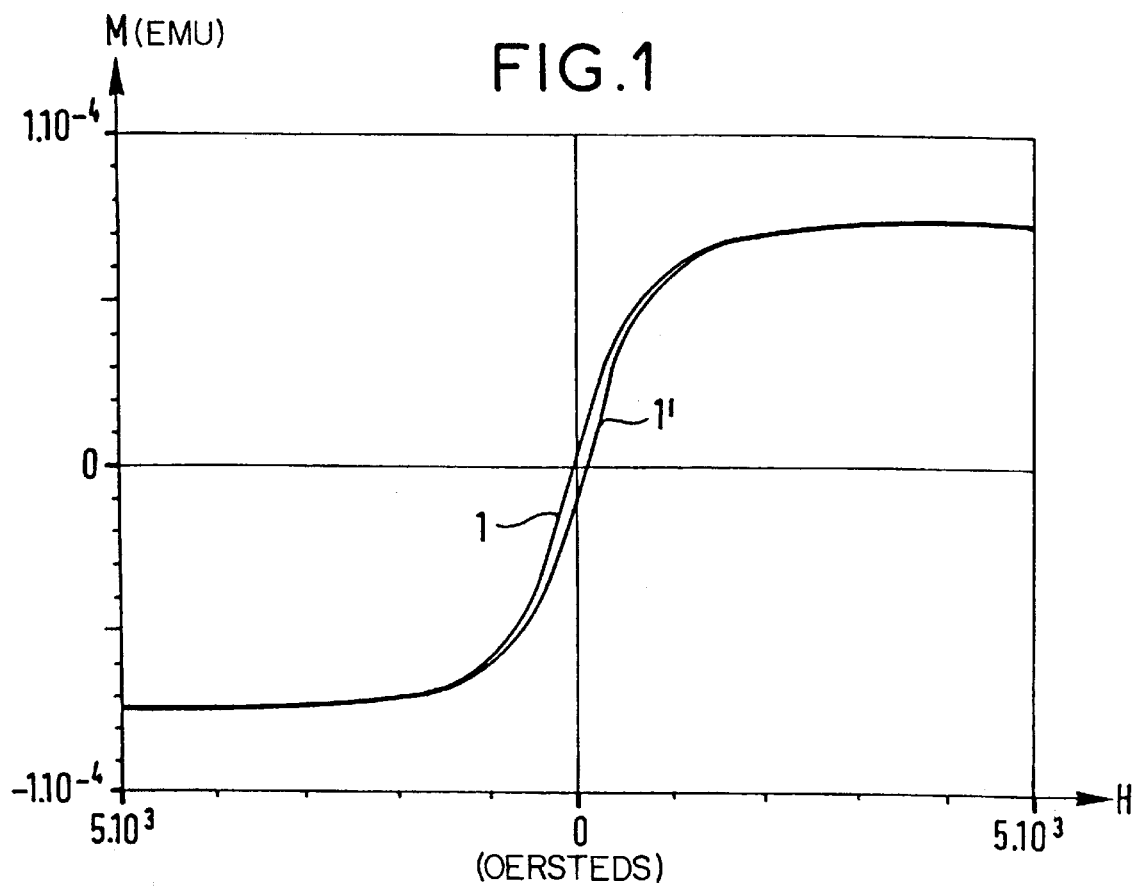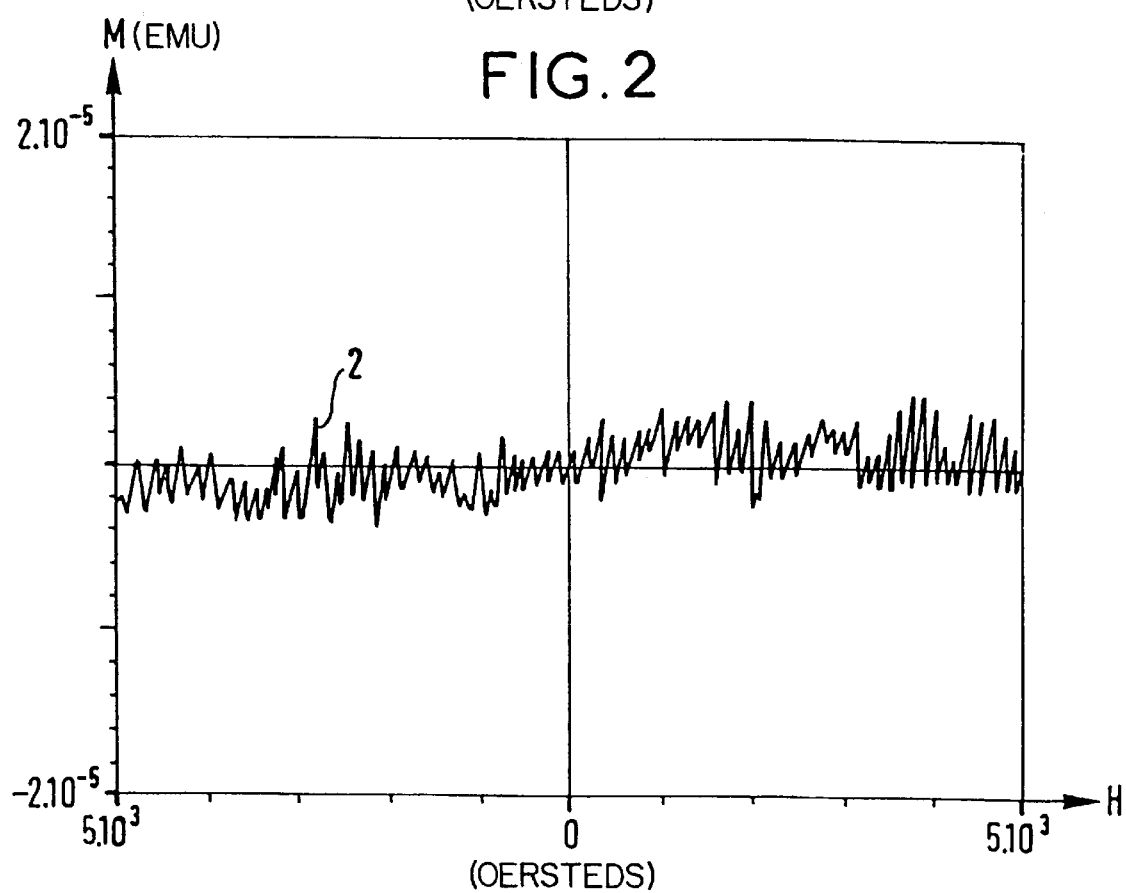

METHOD OF COPOLYMERIZING ANILINE COMPOUNDS

BACKGROUND OF THE INVENTION

1. Field of the Invention

The present invention relates to a method of copolymerizing aniline compounds.

2. Description of the Related Art

European patent application EP-A-0 545 819 discloses copolymers having magnetic properties including aminoaromatic groups, which groups include aniline derivatives. Copolymerization is performed as follows:

a first monomer derived from aniline and a second monomer which is a substituted aminoaromatic compound are suspended or dissolved in an acid medium;

a solution of an oxidizing agent is added to the suspension or solution; and the resulting copolymer is then separated from the reaction medium.

The yield of the copolymerization reaction using that method is very variable. In addition, the resulting copolymer contains a large fraction of monomer that has not reacted and it therefore requires purification.

OBJECTS AND SUMMARY OF THE INVENTION

An object of the present invention is to provide a method that makes it possible to obtain reproducible yields from the copolymerization of aniline-derived compounds.

The present invention provides a method of manufacturing copolymers having magnetic properties, the method comprising a first step of copolymerization, by oxidation in an acid medium, of a first monomer selected from aniline, possibly substituted aniline, and the corresponding iminoquinone forms, and of a second monomer selected from substituted aminoaromatic compounds, such as substituted amino compounds comprising at least two condensed benzene nuclei, substituted polycyclic compounds comprising at least one aniline unit in their structure, the compounds derived from aniline carrying a substituent connected to the nucleus by an ethynylidene or a paraphenylene side-chain, and the corresponding iminoquinone compounds. The first step comprises:

an induction stage during which said first monomer is put into the presence of at least one oxidizing agent and at least one initiating agent, where the term "induction stage" is used to mean the stage during which homopolymerization of the first monomer begins; and a production stage during which, after said second monomer has been added, at least one oxidizing agent and at least one initiating agent are added progressively, where the term "production stage" is used to mean the stage during which copolymerization of the two monomers takes place.

The initiating and/or oxidizing agent added during the induction stage may be identical to or different from the corresponding agent added during the production stage. It is possible to use a single agent or a mixture of agents.

The duration of the induction stage is longer than 3 seconds and shorter than 1 hour. This duration is determined by the appearance of a very fine precipitate of polyaniline that is observed visually. The second monomer is added after a delay of 1 second to 1 minute. The duration of the induction stage is related to the quantity of oxidizing agent added. When the duration of the induction stage is too short, the homopolymerization of the aniline is not sufficiently advanced for subsequent copolymerization to be possible. In contrast, if the duration is too long, then the formation of long chains of polyaniline prevent subsequent copolymerization in a sequence that enables ferromagnetism to appear.

During the induction stage, the quantity of oxidizing agent added is less than or equal to 5% of the total quantity of oxidizing agent, and the quantity of initiating agent added is less than or equal to 25% of the total quantity of oxidizing agent, the remaining quantities of said agents being added during the production stage.

Advantageously, the initiating agent is selected from oligomers obtained from aniline and its derivatives, and the initiating agent is preferably N-phenyl-p-phenylenediamine.

In a first variant of the first step of the method, the oxidizing agent is a compound from the group comprising persulfates, bichromates, chromates, iodates, permanganates, and oxygenated water. The oxidizing agent can be used pure or in solution, as appropriate.

In a second variant of the first step, said oxidizing agent is gaseous oxygen, e.g. bubbled through.

In a third variant of the first step, copolymerization is performed by oxidation in the presence of an active electrode under tension. The electrochemical technique makes it possible to control oxidization of monomers so as to adjust the quantity of copolymer formed.

In addition, in another variant of the first step of the method, oxidation may be performed in the presence of a catalyst, thereby making it possible to increase the yield of the reaction.

The monomer is selected from aniline, optionally substituted by a substituent selected from the radical —$CF_3$, the radical —$OCH_3$, an alkyl radical, and a substituent having the formula —A—Z in which A is a hydrocarbon radical having 2 to 8 carbon atoms having at least one heteroatom selected from O and S inserted therein, and Z is at least one proton donor substituent or a salt thereof, and the corresponding iminoquinone forms.

The second monomer is selected from Cleve's acids: 8-amino-2-naphthalenesulfonic acid (the $\theta$ form) and 5-amino-2-naphthalenesulfonic acid (the $\beta$ form); Laurent's acid: 1-amino-5-naphthalenesulfonic acid; peri acid: 1-amino-8-naphthalenesulfonic acid, and the following diacids: 1-naphthamino-5,7-disulfonic acid and 1-naphthylamino-6,8-disulfonic acid.

In another implementation, the method further includes a second step in which the resulting polymer is purified and separated from the reaction medium, and a third step in which the soluble phase of the copolymer is extracted.

In a first variant of this implementation, the method further includes a third step in which a soluble phase is extracted from the copolymer by making a solution by means of a volatile base, after which the solution is evaporated rapidly under a vacuum and the solid residue is subjected to heat treatment.

The soluble phase is preferably extracted by making a solution in anhydrous liquid ammonia.

In a second variant of this implementation, the method further includes a third step in which the soluble phase is extracted from the copolymer by making a basic solution, and then the solution is made acidic so as to precipitate the soluble phase.

The solution is preferably made in a solution of a volatile base in an organic solvent, e.g. an alcoholic ammonia solution.

In another variant of the implementation, the soluble phase is reprecipitated or recrystallized under a magnetic and/or an electric field.

The method of the present invention has the advantage of stabilizing the copolymer fabrication yield without losing the magnetic characteristics thereof.

BRIEF DESCRIPTION OF THE DRAWINGS

Other characteristics and advantages of the present invention appear on reading the following examples of implementations that are naturally given purely by way of non-limiting illustration, with reference to the accompanying drawing, in which:

FIG. 1 is a hysteresis diagram showing variation in the magnetic signal M as a function of cyclic variation in the field H, e.g. for a ferromagnetic copolymer obtained by the method of the invention;

FIG. 2 is analogous to FIG. 1 but for an example of a copolymer whose ferromagnetic response is not detectable.

In FIGS. 1 and 2 the applied magnetic field H is plotted in Oersteds along the abscissa, and the magnetic signal M is plotted up the ordinate in relative units (electromagnetic units: emu) for the mass of the sample of copolymer being analyzed.

DESCRIPTION OF THE PREFERRED EMBODIMENTS

Example 1

0.42 grams (g) of aniline were added to 10 ml of water that had been acidified with 1 g of paratoluene-sulfonic acid with stirring at room temperature. The following were then added to said solution: 50 mg of ammonium persulfate and a drop of methanol containing 0.03 mg of N-phenyl-p-phenylenediamine in solution. The reaction was allowed to continue for 2 minutes. That constituted the induction stage.

The operations that followed constituted the production stage. 1 g of 5-amino-2-naphthalenesulfonic acid (the β form of Cleve's acid) were added to the medium. After a delay of about 3 minutes, 0.3 ml of a solution of 1 gram per liter (g/l) of N-phenyl-p-phenylenediamine in methanol were added. Addition took place over a duration of 1 minute and 20 seconds. Such addition was repeated every 10 minutes for 2 hours. During the same 2-hour period, 2.27 g of ammonium persulfate in powder form were added to the solution. The reaction medium was then stirred for 1 hour.

The precipitate was washed and separated from the resulting suspension. Washing consisted in redispersing the precipitate in a solution of 25% dimethylformamide in water, followed by recovery by centrifuging. Washing was terminated with solvents containing very little water: a solution having 25% by volume acetic acid in methanol or ether.

The resulting greenish mass was then dried for 24 hours at 75° C. in a vacuum. The copolymer was in the form of a very dark green powder having a mass of 28.4 mg, i.e. a yield of 2%.

Its total formula was as follows:

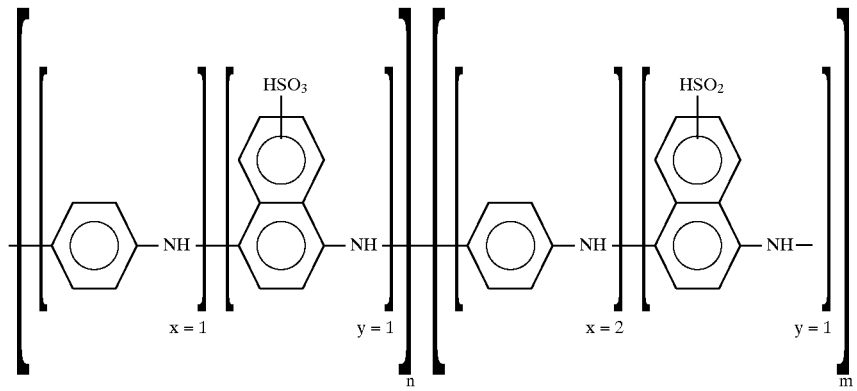

where n is much greater than m.

Magnetism was measured at a temperature of 300K using an alternating field gradient magnetometer. The result is given by curves 1 and 1' in FIG. 1 which show how magnetization M varies as a function of the magnetic field H applied to the sample. This curve is characteristic of a ferromagnetic compound and it presents hysteresis. The magnetization at saturation $M_s$ is 0.4 emu/g.

Example 2

0.24 g of aniline were added to 10 ml of water that had been acidified with 1 g of paratoluenesulfonic acid with stirring at room temperature. The induction stage consisted in adding to said solution a few drops of a solution of 2.32 g of ammonium persulfate in 10 ml of water acidified by 1 g of paratoluenesulfonic acid, giving about 12 mg of ammonium persulfate, together with a drop containing 0.03 mg of N-phenyl-p-phenylenediamine in concentrated solution in methanol.

After 10 minutes, 1 g of 5-amino-2-naphthalene-sulfonic acid (the β form of Cleve's acid) were added to the medium. The reaction was sustained by simultaneously adding the remainder of the solution of ammonium persulfate at a rate of 10 ml/h, together with 0.3 ml of a solution at 1 g/l of N-phenyl-p-phenylenediamine in methanol. The reaction medium was then stirred for 1 hour.

A suspension was obtained and its phases were separated by washing and centrifuging, followed by drying at 75° C. under conditions analogous to those described for Example 1. 24 mg of copolymer were obtained, giving a yield of 1.7%.

Its total formula was analogous to that of the copolymer prepared in Example 1, and its magnetization on saturation was 0.4 emu/g.

Example 3

0.42 g of aniline were added to 10 ml of water that had been acidified with 1 g of paratoluenesulfonic acid and stirred at room temperature. The induction stage consisted in adding to said solution a few drops of a solution of 2.32 g of ammonium persulfate in 10 ml of water acidified with 1 g of paratoluenesulfonic acid, giving about 12 mg of ammonium persulfate, and 5 µl of a solution containing an oligomer of aniline in the nascent state and prepared as follows: in 1 ml of water acidified with 100 mg of paratoluenesulfonic acid and stirred at room temperature, 0.042 g of aniline and 232 mg of ammonium persulfate were added and allowed to react for 6 minutes until it was visually observed that polyaniline had appeared in the medium.

After 10 minutes, 1 g of 5-amino-2-naphthalenesulfonic acid (the β form of Cleve's acid) were added to the medium. The reaction was sustained by adding the remainder of the ammonium persulfate solution at a rate of 10 ml/h. During this same period of about 2 hours, 5 µl of the solution containing an oligomer of aniline in the nascent state were added once every half hour. The reaction medium was then maintained under stirring for 1 hour.

A suspension was obtained and its phases were separated by washing and centrifuging, followed by drying at 75° C. under conditions analogous to those described in Example 1. Its total formula was analogous to that of the copolymer prepared in Example 1, and its magnetization and saturation was 0.4 emu/g.

Example 4 Comparison 0.42 g of aniline were added to 10 ml of water that had been acidified with 1 g of paratoluenesulfonic acid stirred at room temperature. To said solution there were added 50 mg of ammonium persulfate together with a drop containing 0.03 mg of N-phenyl-p-phenylenediamine in concentrated solution in methanol. Reaction was allowed to continue for 1 minute. That constituted the induction stage.

1 g of 5-amino-2-naphthalenesulfonic acid (the β form of Cleve's acid) was then added to the medium. Thereafter 0.3 ml of a solution at 1 g/l of N-phenyl-p-phenylenediamine in methanol were added. Addition took place over a duration of 1 minute and 20 seconds, and the addition was repeated once every 10 minutes for 2 hours. Simultaneously, 2.27 g of ammonium persulfate in powder form were added to the solution. The reaction medium was stirred for 1 hour. A suspension was obtained and its phases were separated in the manner described in Example 1.

After washing, no insoluble product remained. The copolymer yield of the reaction was zero because the duration of the induction stage was too short to enable a sufficient quantity of polyaniline to form.

Example 5 Comparison

The procedure was analogous to that described in Example 4, with the exception that the induction stage lasted for 8 minutes. 120 mg of a black product was obtained but it was not ferromagnetic. The yield was 8.5%.

The duration of the induction stage was too long, thereby enabling long chains of polyaniline to form thus preventing subsequent copolymerization in a sequence that enables ferromagnetism to appear.

Example 6 Comparison 0.42 g of aniline were added to 10 ml of water that had been acidified with 1 g of paratoluenesulfonic acid at room temperature. To said solution, there were added 50 mg of ammonium persulfate together with a drop containing 0.03 mg of N-phenyl-p-phenylenediamine in concentration solution in methanol. Reaction was allowed to continue for 6 minutes until the appearance of polyaniline particles could be seen in the mixture.

1 g of 5-amino-2-naphthalenesulfonic acid were then added to the medium, followed by progressive addition of 2.27 g of ammonium persulfate in powder form. A suspension was obtained, and its phases were separated in the manner described in Example 1.

76 mg of an insoluble product (yield 5.3%) were then obtained and its ferromagnetic response was not detectable. Magnetization was not measurable using a "MICROMAG 2000" alternating field gradient magnetometer. The result can be seen in the form of curve 2 in FIG. 2, where the signal, if any, is buried in the background noise of the apparatus.

Naturally, the various numerical values mentioned are given purely by way of non-limiting example. The person skilled in the art can devise numerous variants of the present invention without going beyond the spirit thereof. In particular, without going beyond the ambit of the invention, any means may be replaced by equivalent means.

We claim:

1. A method of manufacturing copolymers having magnetic properties, the method comprising a first step of copolymerization, by oxidation in an acid medium, of a first monomer selected from the group consisting of aniline, substituted aniline, and the corresponding iminoquinone forms, and of a second monomer which is a substituted aminoaromatic compound selected from the group consisting of a substituted amino compound comprising at least two condensed benzene nuclei, a substituted polycyclic compound comprising at least one aniline unit in its structure, a compound obtained from aniline having a substituent bonded to the nucleus by an ethynylidene or a paraphenylene side chain, and the corresponding iminoquinone compounds, wherein said first step comprises:

an induction stage during which said first monomer is put in contact with at least one oxidizing agent and at least one initiating agent, and during which induction stage not more than 5% of a total quantity of said oxidizing agent is added; and a production stage during which, after said second monomer has been added, at least one oxidizing agent and at least one initiating agent are added progressively, whereby a copolymer having magnetic properties results.

2. A method according to claim 1, wherein the duration of said induction stage is greater than 1 minute and less than 1 hour.

3. A method according to claim 1, wherein, during said induction stage, not more than 5% of the total quantity of said oxidizing agent is added and not more than 25% of a total quantity of said initiating agent is added, remaining quantities of said agents being added during said production stage.

4. A method according to claim 1, wherein said initiating agent is selected from oligomers obtained from aniline and derivatives thereof.

5. A method according to claim 4, wherein said initiating agent is N-phenyl-p-phenylenediamine.

6. A method according to claim 1, wherein said oxidizing agent is a compound selected from the group comprising persulfates, bichromates, chromates, iodates, permanganates, and oxygenated water.

7. A method according to claim 1, wherein said oxidizing agent is gaseous oxygen.

8. A method according to claim 1, wherein the copolymerization is performed by oxidation in contact with a live active electrode.

9. A method according to claim 6, wherein the oxidization is performed in contact with a catalyst.

10. A method according to claim 1, wherein said first monomer is selected from the group consisting of aniline, aniline substituted by a substituent selected from the group consisting of a radical —$CF_3$, a radical —$OCH_3$, an alkyl radical, and a substituent having the formula —A—Z in which A is a hydrocarbon radical having 2 to 8 carbon atoms having at least one heteroatom selected from O and S inserted therein, and Z is at least one proton donor substituent or a salt thereof, and the corresponding iminoquinone forms.

11. A method according to claim 1, wherein said second monomer is selected from:

8-amino-2-naphthalenesulfonic acid;

5-amino-2-naphthalenesulfonic acid;

1-amino-5-naphthalenesulfonic acid;

1-amino-8-naphthalenesulfonic acid;

1-naphthylamino-5,7-disulfonic acid; and 1-naphthylamino-6,8-disulfonic acid.

12. A method according to claim 1, further including a second step of purifying and separating the resulting copolymer, and a third step of extracting a soluble phase of the resulting copolymer.

13. A method according to claim 12, wherein said soluble phase is extracted from said copolymer by making a solution in a volatile base, and then rapidly evaporating said solution in a vacuum resulting in the formation of a solid residue, with the solid residue being subjected to heat treatment.

14. A method according to claim 13, wherein said volatile base is anhydrous liquid ammonia.

15. A method according to claim 12, wherein said soluble phase is extracted from said copolymer by making a basic solution, and then making said solution acidic to precipitate said soluble phase.

16. A method according to claim 15, wherein said basic solution is a solution of a volatile base in an organic solvent.

17. A method according to claim 12, wherein the extraction of said soluble phase is performed under a magnetic field.

* * * * *